Jan. 22, 1929.                                                                1,699,814
B. F. SCHMIDT
PROGRESSIVE AND SELECTIVE GEAR SHIFT
Filed March 16, 1926          5 Sheets-Sheet 2

INVENTOR:
BENJAMIN F. SCHMIDT.
BY Fad W Harris
ATTORNEY

Jan. 22, 1929.    B. F. SCHMIDT    1,699,814
PROGRESSIVE AND SELECTIVE GEAR SHIFT
Filed March 16, 1926    5 Sheets-Sheet 3

INVENTOR:
BENJAMIN F. SCHMIDT,
By

ATTORNEY.

Patented Jan. 22, 1929.

1,699,814

UNITED STATES PATENT OFFICE.

BENJAMIN F. SCHMIDT, OF LOS ANGELES, CALIFORNIA, ASSIGNOR OF ONE-FOURTH TO KING C. GILLETTE AND ONE-FOURTH TO KING G. GILLETTE, BOTH OF LOS ANGELES, CALIFORNIA.

PROGRESSIVE AND SELECTIVE GEAR SHIFT.

Application filed March 16, 1926. Serial No. 95,016.

This invention relates to an improved type of progressive and selective gear shift mechanism, and is particularly directed to a mechanism adapted for association with the sliding gear type of speed change transmission mechanism such as is usually incorporated in motor vehicles.

It is an object of the present invention to provide a gear shift mechanism which may be readily and easily applied to the standard forms of motor vehicle construction for cooperation with the transmission mechanism and the clutch actuating pedal thereof.

A further object is to provide a gear shift mechanism of the pre-selective type under control of a selector lever accessible for pre-selective operation by the driver and operated by depression of the clutch pedal beyond its clutch disengaging stroke, and to incorporate in such pre-selective connections means rendering it possible to select a progression of gear changes to be effected to attain the desired gear shift, and further it is an object to arrange the mechanism in a manner whereby with a single setting of said lever the several gear changes of such progression will automatically be effected upon successive clutch pedal actuations. It is also an object to maintain such progressive gear changing under automatic control of an escapement means confining such progressive gear changing to gear changes upwardly from "reverse" to "high" driving speeds and functioning as an automatic ratchet means permitting unrestricted selection downwardly from "high" to "reverse" speed changes.

Another object is to provide a gear shift mechanism of the above character having a rotary selectively positioned actuator unit adapted to be pre-set prior to each clutch pedal actuation, to determine the gear change to be effected, and to be rotated during a clutch pedal actuation, to effect said gear change, said actuator unit insuring a normalizing of the gears between each pedal actuation and having a positive actuation in relation to the depression of the clutch pedal to insure a disengagement of the clutch prior to a gear shift and a completion of a selected gear shift prior to reengagement of the clutch; and a further object is to make provisions whereby, after a gear change is effected, various other gear changes may be selected and completed prior to reengagement of the clutch.

Various other objects and advantages will be more fully apparent from the following description of the accompanying drawings which form a part of this disclosure, and which illustrate a preferred form of embodiment of the invention.

Figures 1, 2, 3:
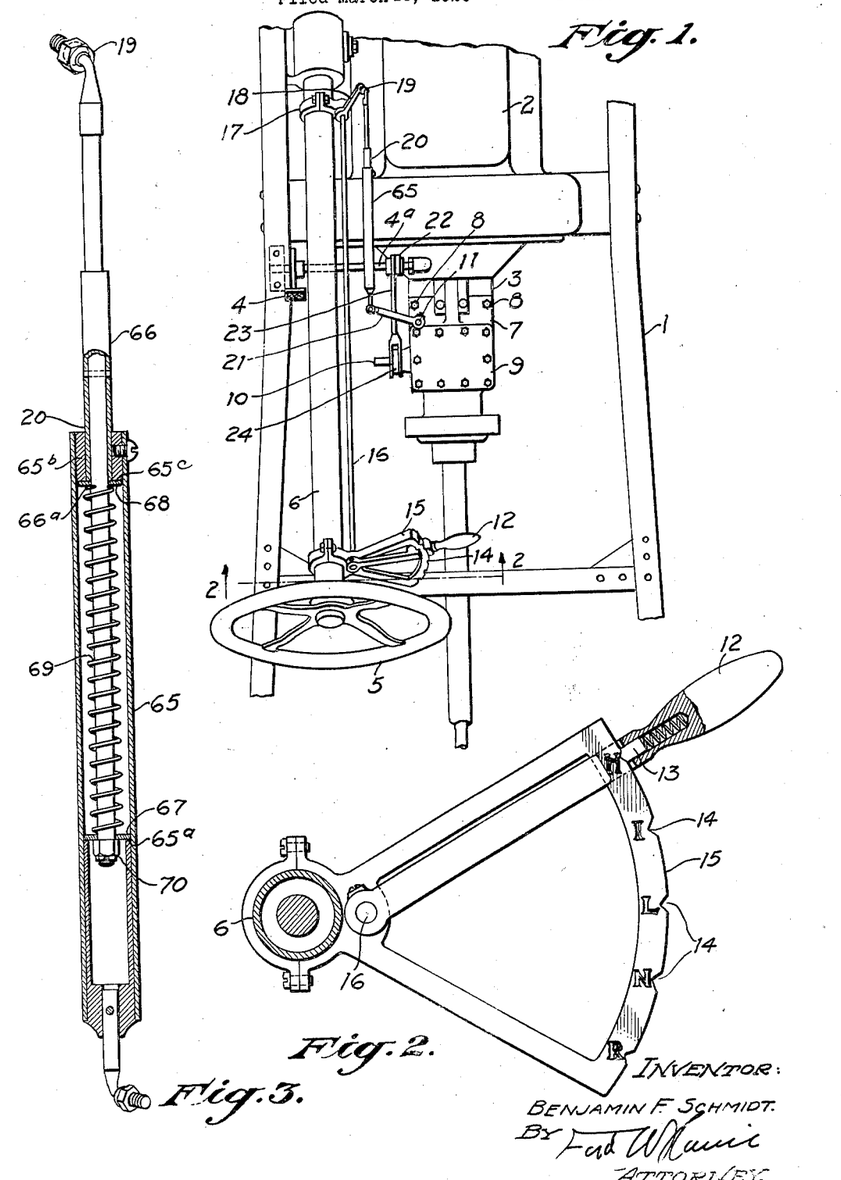
Fig. 1 is a fragmentary plan view of a motor vehicle chassis showing the location of my improved gear shifting mechanism and cooperating parts thereon.
Fig. 2 is an enlarged detail section taken on the line 2—2 of Fig. 1.
Fig. 3 is an enlarged longitudinal section of the spring means forming a part of the connection between the gear shifting mechanism and the control lever on the steering column.

In the drawings, 1 designates the frame of a motor vehicle having a power plant 2, a transmission casing 3, containing the usual speed change gearing, a clutch pedal 4 which operates the usual clutch between the engine and the transmission gears, and a steering wheel 5 on the usual steering column 6. The gear shifting means of the present invention is contained within a housing 7 which is adapted to be secured to the transmission casing 3 to cover the usual opening in the top wall thereof, by bolts 8 or by other suitable means, said housing having a cover plate 9 removable to afford access to the interior mechanism.

The housing 7 contains a preferred type of mechanism (to be later described) arranged to effect the desired shifting of the usual sliding gears of the transmission and includes a horizontal main operating shaft 10 journaled in the side walls of the housing and extending exteriorly thereof on the side towards the steering column, and a vertical selector operating shaft 11 journaled in bearings formed in said housing. In the operation of the device the shaft 11 is rocked to select the speed change to be effected and the main shaft 10 is then rotated to cause the actual shifting of the gears.

The pre-selective actuation of the shaft 11 is effected through its connections with a selector lever 12 positioned just below the steering wheel 5 with its free end within convenient reach of a hand of the operator on the rim of said steering wheel. This selector lever 12 is provided with a spring expelled detent 13 arranged to cooperate with retaining notches 14 in a quadrant 15 along which the lever 12 moves, and said quadrant has designating characters R, N, L, I, H on its upper surface adjacent the respective notches and serving to indicate the respective reverse, neutral, low, intermediate and high positions of the lever. The quadrant 15 is preferably clamped to the steering column 6 and provides a bearing for the upper end of a rod 16 to which the lever 12 is connected, the lower end of said rod being journaled in a bracket 17 clamped on the lower portion of the steering column. Secured on the lower portion of the rod 16 is an arm 18 having a universal ball joint connection 19 with a link connection 20, which extends rearwardly and is pivotally connected, preferably by a ball joint connection similar to that designated at 19, with the outer end of an arm 21 fixed on the exterior end of the selector operating shaft 11.

This arrangement provides a selector control conveniently accessible for manipulation by the driver of the vehicle.

Figure 4:
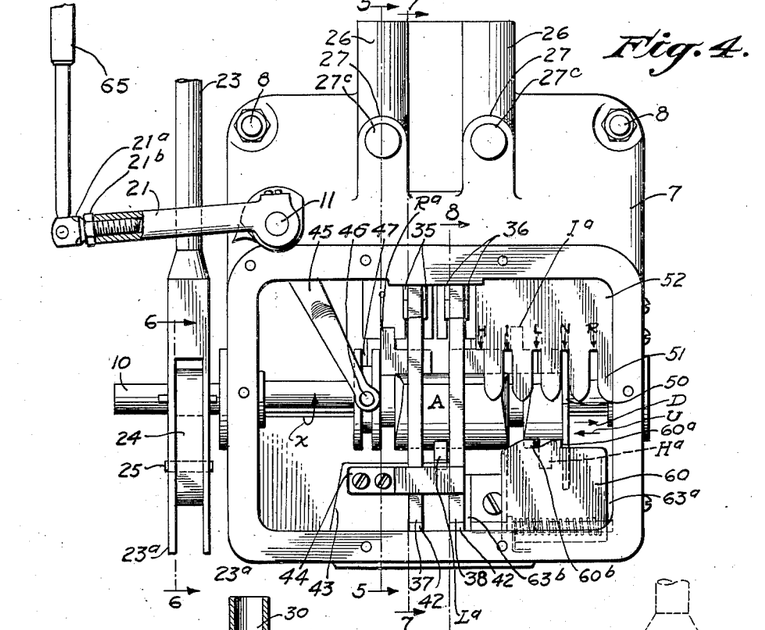
Fig. 4 is an enlarged plan view of the gear shift housing and adjacent parts, the cover of said housing being removed to disclose the interior mechanism.

With particular reference to Fig. 4, it will be noted that the outer end portion of the arm 21 comprises a threaded member 21ª which is screw-threaded into the main portion of said arm and is provided with a locknut 21ᵇ. This arrangement provides for a lengthening or shortening of the arm 21 to closely adjust the throw of the selector operating shaft 11 relative to the fixed degrees of movement of the selector lever 12 as defined by the definitely located notches 14 in the quadrant 15, it of course being understood that prior to such adjustment the rear end of the link connection 20 will be disconnected from the arm 21.

The foot pedal 4 is fixed to the brake operating shaft 4ª which extends into the transmission casing 3 and is arranged to operate the brake in the usual manner. Secured to the shaft 4ª is an upstanding arm 22 and to the upper end of said arm is pivotally connected a gear shift operating link 23 which is operatively associated with the main shaft 10 in a manner to convert the reciprocating movements of said link to rotary movements of the shaft 10. This connection is more particularly illustrated in Figs. 4 and 6, in which the rear end of the link 23 is shown to be vertically slotted to provide relatively spaced limbs 23ª having relatively aligned longitudinal slots 23ᵇ through which the shaft 10 projects and which permit the link 23 to freely slide on the shaft 10 when reciprocated. Positioned between said limbs 23ª and secured to the shaft 10 is a cam member 24 having a slot 24ª in which rides a pin 25 carried by the two links 23ª of the link 23. This arrangement permits an idle reciprocation of the gear shift operating link 23 during the clutch disengaging and clutch engaging operations, that is, during the first part of a depression of the clutch pedal 4, during which time the clutch will be disengaged, the pin 25 will ride idly forward in the slot 24ª in the cam member 24 and with the continuation of the depression of the clutch pedal the pin 25 will rock the cam member 24 to the dotted line position indicated in Fig. 6, thus effecting a gear shifting rotation of the shaft 10. Upon a reverse operation of the clutch pedal the shaft 10 will first be returned to normal position and the clutch will then be let in while the pin 25 slides idly back to the rear end of the slot 24ª. It will be evident that this arrangement will effectively prevent rotative overthrow of the shaft 10.

Figures 5, 6:
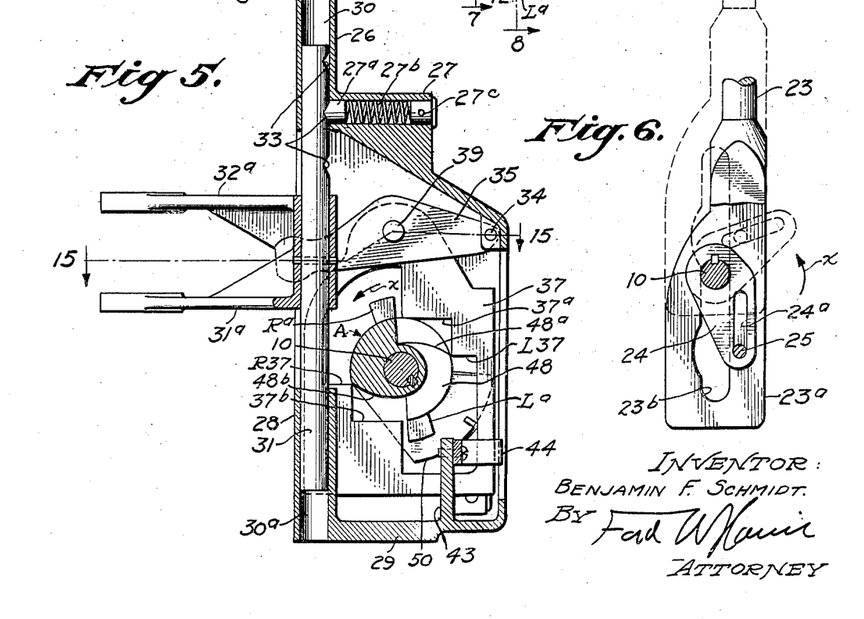
Fig. 5 is a section taken on the line 5—5 of Fig. 4.
Fig. 6 is a detail section taken on the line 6—6 of Fig. 4.
Figures 7, 8:
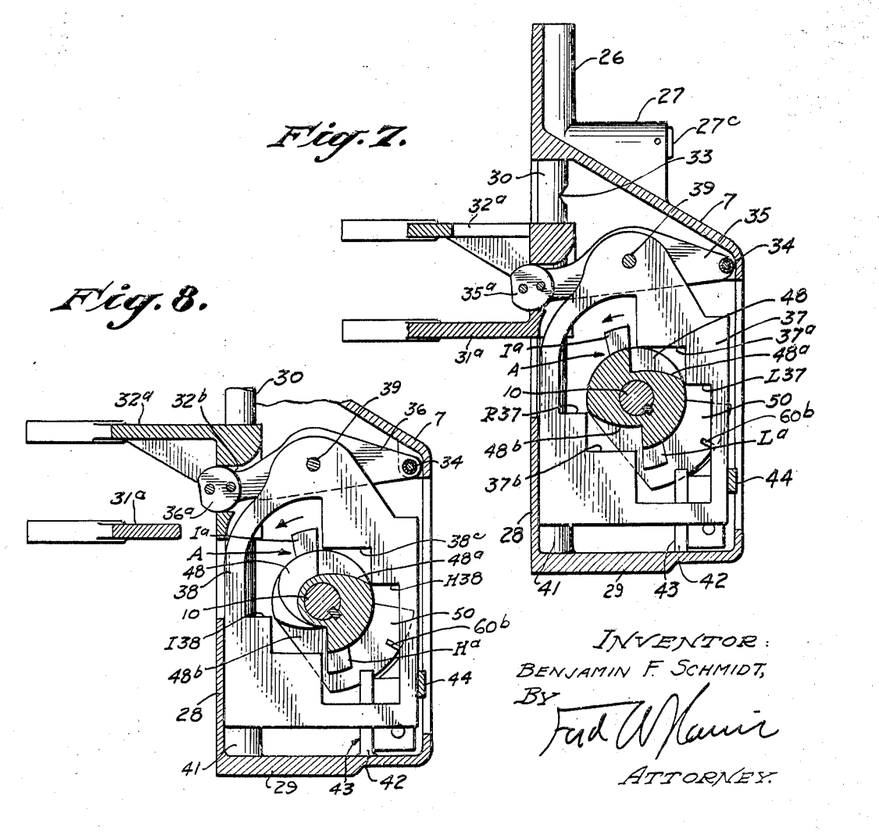
Fig. 7 is a section taken on the line 7—7 of Fig. 4.
Fig. 8 is a section taken on the line 8—8 of Fig. 4.
Figures 13, 14, 15, 16:
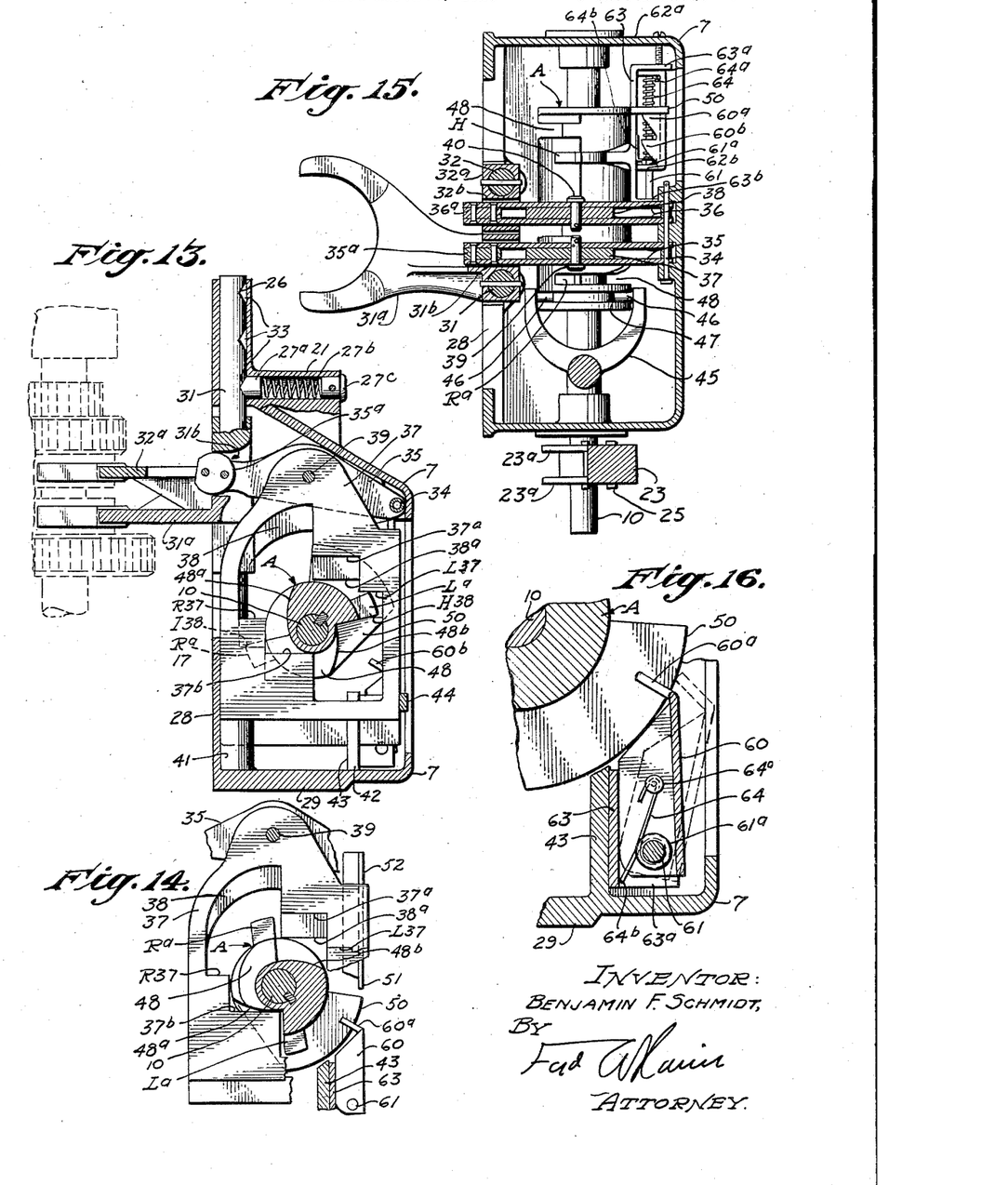
Fig. 13 is a section similar to Fig. 12, showing the shift to low completed.
Fig. 14 is a fragmentary section similar to Fig. 13, showing the selector unit returned to normal after the shift to low has been completed.
Fig. 15 is a section taken on the line 15—15 of Fig. 5.
Fig. 16 is an enlarged detail section taken on the line 16—16 of Fig. 10.

Referring particularly to Figs. 4, 5 and 15, it will be observed that the front wall of the housing 7 extends forwardly to provide two parallel horizontal bosses 26 having respective vertical bosses 27 aligned therewith, and that the lower wall 28 extends only a short distance forwardly from the rear wall 29. The bosses 26 and the lower wall 28 are horizontally bored as at 30, 30ª and slidable in these aligned bores are two shift rods 31 and 32, the shift rod 31 having secured to its medial portion a gear shifting fork 31ª and the shift rod 32 having secured to its medial portion a similar gear shifting fork 32ª. Each of the bosses 27 is provided with a vertical bore intersecting the respective bore 30 and containing a bevel nose detent 27ª which is urged by a spring 27ᵇ to engage the respective shift rod and to enter one of a series of three beveled notches 33 cut therein, said spring abutting against a closure plug 27$^c$ secured in the outer end of the vertical bore. The forks extend downwardly into the transmission casing and engage the respective sliding gears of the transmission mechanism, as indicated in Fig. 13, and said forks will be selectively operated to effect the desired speed change, the respective detents 27$^a$, by their engagement with the respective notches 33 in the shift rods, maintaining said rods and the forks against movement until positively operated. The transmission may be of any of the well known types of sliding gear transmission and the arrangement may, as in the present instance, be such that a rearward shift of the fork 31$^a$ from neutral position will condition the transmission for a reverse drive and a forward shift of said fork from neutral position will condition the transmission for a low forward drive, while a rearward shift of the fork 32$^a$ from neutral position will condition the transmission for an intermediate forward drive and a forward shift of said fork 32$^a$ from neutral position will condition the transmission for a high forward drive.

The hub portions of the respective forks are provided with apertures 31$^b$, 32$^b$, to receive the free ends of a pair of actuator levers which are pivoted on a rod 34 mounted within the housing, and while it is realized that said levers may be of integral construction, they are in the present instance formed of respective pairs of spaced plates 35 and 36 joined at their free ends by filler blocks 35$^a$ and 36$^a$, as is particularly well illustrated in Fig. 15, thus providing said levers 35 and 36 with medial slots to receive the upper ends of respective cam plates 37 and 38 which are pivotally connected to said levers by pins 39 and 40. The cam plates 37 and 38 are of general rectangular shape and are guided for longitudinal reciprocation in slots 41 in the lower wall 28 and in slots 42 in a short intermediate wall 43 of the housing. A strap 44 attached to said wall 43 bridges over the upper edges of said plates to prevent their displacement.

Figure 9:
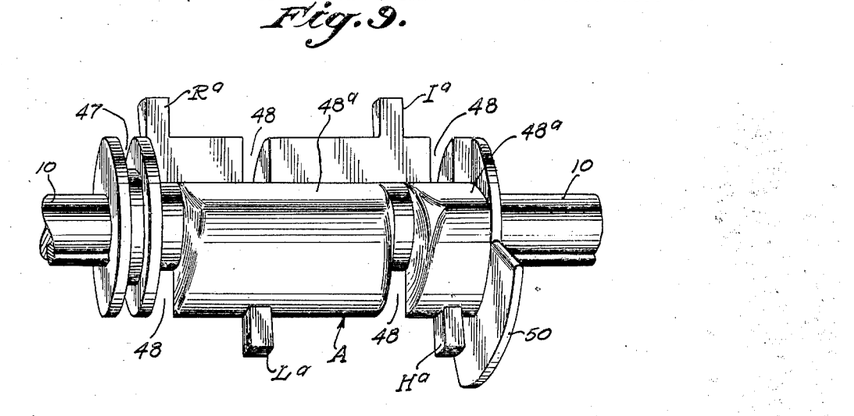
Fig. 9 is a perspective view of the rotary selector unit.

The main shaft 10 passes through large central apertures in the plates 37 and 38, and splined to slide longitudinally upon the shaft 10 is a rotary selective actuator cam unit, indicated generally by the reference character A, and illustrated in perspective in Fig. 9. The central apertures in the cam plates 37 and 38 are of sufficient size and of the proper contour to permit a selective longitudinal shifting of said cam unit when said unit and said plates are in neutral positions, such shifting being accomplished by the selective actuation of the selector shaft 11 which has fixed thereto a forked arm 45 carrying pins 46 in its forks, said pins being arranged to engage in a circumferential groove 47 formed at one end of the cam unit.

The apertures in the respective cam plates are of similar contour, the plate 37 having opposite "neutral" cam shoulders 37$^a$ and 37$^b$, a "reverse" cam shoulder R$^{37}$ and a "low" cam shoulder L$^{37}$, and the plate 38 having opposite "neutral" cam shoulders 38$^a$ and 38$^b$, an "intermediate" cam shoulder I$^{38}$, and a "high" cam shoulder H$^{38}$. These several cam shoulders are adapted to be separately engaged by the cam unit during its rotation to first normalize the cam plates and then reciprocate one or the other of said cam plates to effect the desired gear shift, and to this end the body portion of the cam unit A is of a general cylindrical shape and is cut away on opposite sides to form neutralizing cam surfaces 48$^a$ and 48$^b$ extending throughout the major portion of the length of said cam unit, these cam surfaces being adapted, during the first portion of an operating rotation of said cam unit, to engage a "neutral" cam shoulder of one or the other of the cam plates as may have been shifted during a previous gear shifting operation and return said shifted plate to neutral or normal position before a newly selected gear shift is effected, thus always insuring a neutralization of the transmission between gear shifts.

At suitably spaced intervals the cam unit A is provided with cam lugs which are selectively brought into cooperative alignment with the cam plates 37 and 38 upon a longitudinal selective shifting of the cam unit. Selectively, the cam lug R$^a$ may be aligned with the cam plate 37 to engage the cam shoulder R$^{37}$ and shift said plate rearwardly upon proper rotation of the cam unit, thus effecting a "reverse" gear shift, the cam lug L$^a$ may be aligned with the cam plate 37 to engage the cam shoulder L$^{37}$ and shift said plate forwardly upon proper rotation of the cam unit, thus effecting a "low" gear shift, the cam lug I$^a$ may be aligned with the cam plate 38 to engage the cam shoulder I$^{38}$ and shift said plate rearwardly upon proper rotation of the cam unit, thus effecting an "intermediate" gear shift, or the cam lug H$^a$ may be aligned with the cam plate 38 to engage the cam shoulder H$^{38}$ upon proper rotation of the cam unit to effect a "high" gear shift. Transversely opposite the several cam lugs the body portion of the cam unit A is provided with grooves 48 providing clearance for the reciprocation of the respective cam plates, the edges of said grooves being suitably chamfered to prevent fouling of the parts.

At the end of the cam unit A there is provided a sector-shaped aligning plate 50 which is intended to engage between the adjacent prongs 51 of a forked plate 52 secured in the upper portion of the housing 7, for preventing a shifting of the cam unit during its rotation and for insuring a proper alignment of the cam lugs with the respective cam plates.

Figures 11, 12:
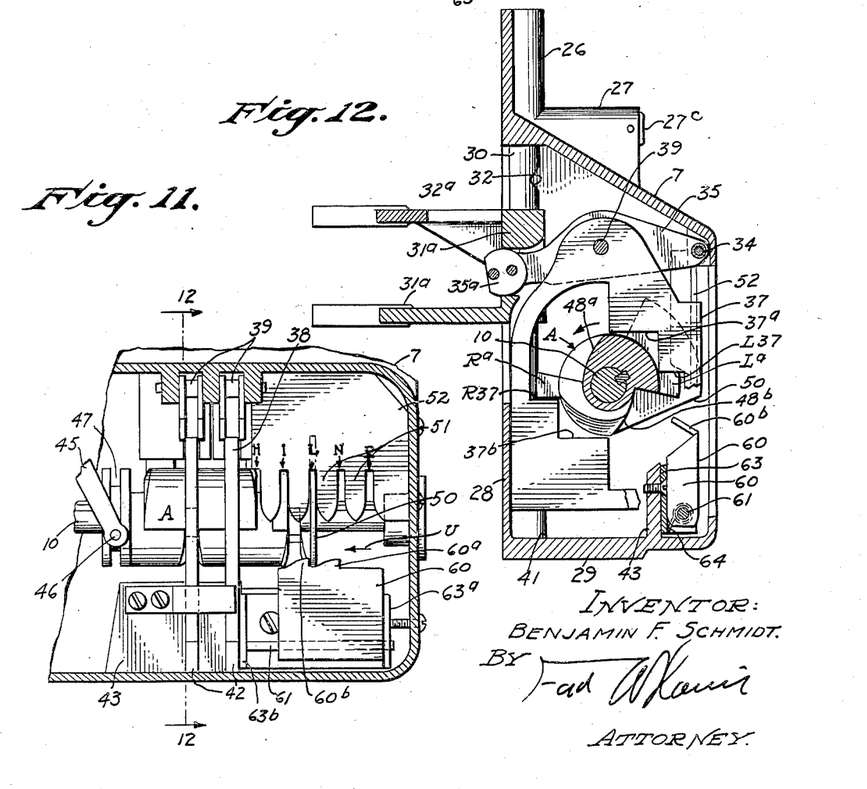
Fig. 11 is a fragmentary plan view similar to Fig. 9, showing the parts set for a shift into low, the slide plates having been normalized preparatory to such shift.
Fig. 12 is a section on the line 12—12 of Fig. 11.

The mechanism thus far described would provide a fully selective gear shift; however, it is an important feature of the present invention to produce a shift mechanism which while fully selective in one direction of selective sequence, is arranged to insure a progressive step-by-step selection from "reverse" to "high" driving speeds. The mechanism for directing such progressive selection comprises a ratchet plate 60 pivotally and slidably mounted on a short rod 61, opposite the forked plate 52, said rod passing through side ears 62$^a$, 62$^b$ of said ratchet plate and being secured at opposite ends in relatively spaced ears 63$^a$, 63$^b$ of a stationary plate 63, said ears 63$^a$ and 63$^b$ serving as stops limiting the sliding movements of the ratchet plate. The stationary plate 63 is secured preferably to the short wall 43 previously referred to and the free end of the ratchet plate is provided with two ratchet teeth 60$^a$, 60$^b$ bent downwardly to extend towards the axis of the main shaft 10 so as to normally extend into the path of sliding movement of the plate 50 on the cam unit A, the downward movement of said teeth being limited by contact of the ears 60$^a$, 60$^b$ with the plate 63. A coil spring 64 surrounds the rod 61 between an abutment 61$^a$ thereon and the ear 62$^a$ of the ratchet plate, one end of said spring being attached to said ear 62$^a$ as at 64$^a$ and the other end engaging the stationary plate 63 as at 64$^b$. This spring is normally under circular tension to yieldingly maintain the ratchet plate swung to normal position with its teeth in the path of the aligning plate 50, and is also under compressive tension to yieldingly maintain said ratchet plate normally shifted to contact with the ear 63$^a$ of the stationary supporting plate 63, as illustrated in Figs. 4 and 11.

Figure 10:
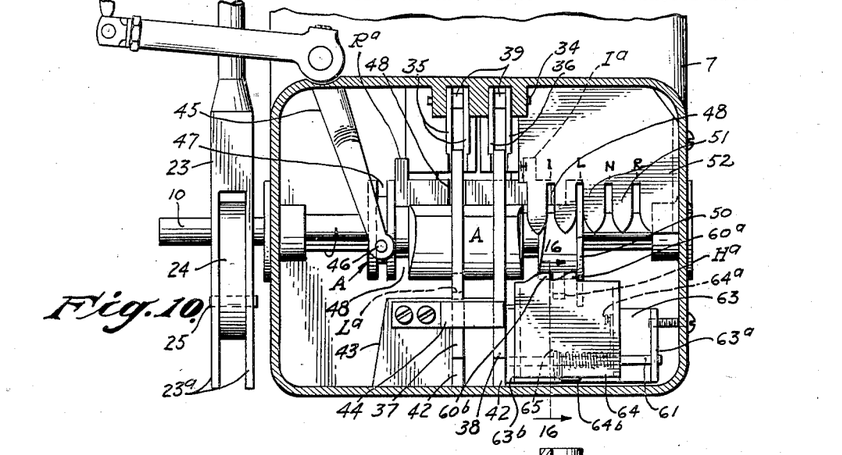
Fig. 10 is a plan view similar to Fig. 4, showing the mechanism set for a shifting operation into low.

With the parts in "neutral" position as shown in Fig. 4, a shifting of the cam unit A in the direction of the arrow U in said figure up to "low" position will cause the aligning plate 50 to engage the first tooth 60$^a$ of the ratchet plate 60 and translate said plate to the limit of its stroke as shown in Fig. 10. The cam unit A may then be rotated to shift the gears and during such rotation the rear edge of the aligning plate 50 will escape the tooth 60$^a$, whereupon the ratchet plate will be shifted back to its normal position by the spring 64. When the cam unit A is then given a return rotation, the plate 50 will enter between the two ratchet teeth as shown in Fig. 11 so that upon further upward shift to "intermediate" the plate 50 engages the ratchet tooth 60$^b$ and again shifts the ratchet plate. The cam unit A may again be rotated to shift the gears, the plate 50 escaping the tooth 60$^b$ and the ratchet plate 60 again being shifted back to its normal position as before. The single step shift from "intermediate" to "high" is effected independently of the ratchet plate. Upon any reverse shifting of the cam unit A the plate 50 will ratchet by the teeth 60$^a$, 60$^b$, rocking the ratchet plate to the position indicated in dotted lines in Fig. 16, as the plate 50 passes each tooth. Thus the plate 60 serves in one instance as an escapement device determining a step-by-step progression upwardly to "high" and as a ratchet device permitting free downward selection to "reverse".

It will be evident from the above that an appropriate setting of the hand lever 12 by the driver will effect a selective shifting of the cam unit A and that upon a depression of the clutch pedal 4 the clutch will first be disengaged and subsequently the cam unit A will be rotated, the first portion of said rotation effecting a normalization of such of the cam plates 37, 38 as may have been shifted during a prior gear shifting operation and the continued rotation of said cam unit effecting a proper shifting of the selected cam plate to accomplish the desired speed change.

With the parts in normal positions and the cam unit A set to "neutral", as shown in Figs. 4 to 9 and 15, the clutch will be in engagement and a rotation of the cam unit by a depression of the clutch pedal will have no effect upon the gear shift mechanism as neither of the cam lugs of said cam unit is at this time in alignment with either of the cam plates; however, had a cam plate been out of "neutral" position one or the other of the "neutral" cam surfaces 48$^a$, 48$^b$ of the cam unit would have acted upon one of the "neutral" cam shoulders of such plate and returned it to its "neutral" position.

From the "neutral" position shown in Fig. 4, let it be assumed that the cam unit A is shifted in the direction of the arrow D one step. This will bring the aligning plate 50 opposite the "reverse" slot R in the forked plate 52 and the cam lug R$^a$ and companion clearance groove 48 into alignment with the cam plate 37, similar to the position illustrated in Fig. 5. With the mechanism so set, the clutch pedal may be depressed and the clutch will be disengaged while the pin 25 (see Fig. 6) travels idly in the slot 24$^a$. A further depression of the clutch pedal 4 will cause the pin 25 to rotate the main shaft 10 and the cam unit A in the direction of the arrows $x$ in Figs. 4 to 6 and such rotation will cause the aligning plate 50 to enter the "reverse" slot R in the forked plate 52 and the "reverse" cam lug R$^a$ to engage the "reverse" cam shoulder R$^{37}$ of the cam plate 37 and shift said cam plate rearwardly and with it the actuator arm 35 and gear shifting fork 31$^a$, thus effecting a shifting of the transmission gears to "reverse". Upon release of the clutch pedal 4 the cam unit A will be rotated in a reverse direction, the detent 27$^a$ retaining the shifted parts against displacement, and the clutch will be subsequently re-engaged during the final idle return movement of the operating link 23. The manner of shifting from "reverse" to "neutral" is obvious. A selective setting of the cam unit A, in the direction of the arrow U in Fig. 4, to the "low" position will cause the aligning plate 50 to shift the ratchet escapement plate 60 to the position shown in Fig. 10, thus preventing the cam unit A being shifted farther in this direction in a single shifting movement. In this position of the cam unit the plate 50 is aligned with the "low" slot L of the forked plate 52 and the cam lug $L^a$ is in alignment with the cam plate 37. A rotation of the cam unit will cause the lug $L^a$ to engage the "low" cam shoulder $L^{s7}$ of the cam plate 37 and shift said cam plate forwardly, as shown in Fig. 13, and with it the actuator arm 35 and gear shifting fork $31^a$, thus effecting a shifting of the transmission gears to "low", the ratchet escapement plate 60 escaping beneath the lower edge of the upwardly traveling aligning plate 50 and returning to its normal position under the influence of its spring 64. Upon the return rotation of the cam unit A from the position shown in Fig. 13 to the position shown in Figs. 11 and 14, the aligning plate 50 will enter the space between the two teeth $60^a$ and $60^b$ of the ratchet plate 60 so that upon a subsequent shift from "low" to "intermediate" position said ratchet plate will again serve to limit the shifting of the cam unit in a manner similar to that above explained. When said shift of the cam unit A from "low" to "intermediate" is made in the direction of the arrow U in Fig. 11, the aligning plate 50 will align with the "intermediate" slot I in the forked plate 52 and the "intermediate" cam lug $I^a$ of said cam unit will align with the cam plate 38, similar to the position illustrated in Fig. 8. With the parts so set, an operating rotation of the cam unit A will cause the aligning plate 50 to enter the "intermediate" slot I in the forked plate 52 and the "intermediate" cam lug $I^a$ to engage the "intermediate" cam shoulder $I^{38}$ of the cam plate 38 and shift said cam plate rearwardly and with it the actuator arm 36 and shifting fork $32^a$, thus effecting a shifting of the transmission gears to "intermediate", the ratchet plate 60 escaping beneath the lower edge of the aligning plate 50 as before explained. In a similar manner a shifting of the cam unit A to "high" position will bring the "high" cam lug $H^a$ into position to engage the "high" cam shoulder $H^{38}$ of the cam plate 38 and effect a shift of the transmission gears to "high".

While the shift progression upwardly to "high" thus follows a predetermined sequence, there is no restraint upon a free selection in the reverse direction, that is, a selection from any one setting, downwardly (towards "reverse") to any other setting may be made in a single selective setting of the cam unit A.

The present invention further contemplates the provision of a tension means in the link connection 20 between the setting lever 12 and the selector shaft 11, such tension means serving as a shock absorber preventing breakage of parts upon an abnormal application of force to the control lever 12, and providing an arrangement permitting a pre-setting of said control lever while the speed change gears are being shifted and a storing of energy for subsequent automatic actuation of the selector mechanism. This tension means is preferably incorporated in the link connection 20 in the manner illustrated in detail in Fig. 3, in which said link connection comprises a tubular section 65 having an internal shoulder $65^a$ and a plug $65^b$ secured in its free end and providing an opposed shoulder $65^c$, and a rod section 66 slidable through a central bore in said plug and provided with an abutment shoulder $66^a$. A washer 67 loosely surrounds the rod section 66 and normally rests upon the shoulder $65^a$ and an opposite washer 68 likewise loosely surrounds said rod section and normally engages the shoulder $65^c$, a coil spring 69 which surrounds the rod section within the tubular section being normally under sufficient tension to maintain said washers against their respective cooperating shoulders. An abutment nut 70 is secured to the end of the rod section below the washer 67, and the opposite ends of the telescoping tubular and rod sections are respectively connected to the arms 18 and 21, as previously explained.

As the aligning plate 50 engages the forked plate 52 while the gears are being shifted, it will be evident that with an unyielding connection between the selector mechanism and the control lever 12, a subsequent gear shift could not be selected until the gears are fully shifted and the plate 50 is returned to normal. With the yielding connection above described such pre-selection can be effected while the gears are being shifted and with the plate 50 engaged in a slot in the forked plate 52, such pre-selective movement of the lever 12 causing relative movement between the telescoping sections of the link connection 20 with a resultant storage of energy in the spring 69. Upon return to normal of the cam unit A upon completion of the gear shift and the consequent withdrawal of the aligning plate 50 from engagement with the forked plate 52, such stored energy in the spring 69 will immediately effect a shifting of the cam unit A to the proper position to effect the desired pre-selected gear shift upon subsequent manipulation of the clutch pedal and rotation of said cam unit.

It will be evident from an examination of

Fig. 3 that the link connection 20 is effective during movement of the control lever 12 in either direction so that if the pre-selection is towards "reverse" and the lever 12 exerts a push on the link section 66, its shoulder 66ª engaging the washer 68 will translate said washer and compress the spring 69, thus exerting a pushing tension on the link section 65 and the parts connecting it to the cam unit A, and so that if the pre-selection is towards "high" and the lever 12 exerts a pull on the link section 66 the abutment nut 70 on said rod section engaging the washer 67 will translate said washer and compress the spring 69, thus exerting a pulling tension on the link section 65. In the present invention this tension link connection is of particular utility in the operation of shifting to "high" in the progressive manner heretofore explained and as governed by the ratchet plate 60, as said link connection has a sufficient scope of movement to permit the setting lever 12 being preset directly to "high", thus storing sufficient energy in the spring 69 to automatically carry the cam unit A through the step-by-step selective progression necessary to effect the upward progressive shifting of the gears upon the subsequent successive rotations of the cam unit A by the successive manipulations of the clutch pedal. That is, with the parts as shown in Fig. 4, a pre-setting of the lever 12 to the "high" position will first cause the cam unit A and the ratchet plate 60 to be shifted to the position shown in Fig. 10 and then the spring 69 in the link connection will be fully tensioned. In effecting a shift into "low" by operation of the cam unit the plate 50 will allow escapement of the ratchet plate 60 while the "low" shift is being made and will then return between the two teeth of said ratchet plate, whereupon the energy stored in the spring will immediately effect a shift of the cam unit A and ratchet plate 60 another step to the "intermediate" position. A shift of the gears to "intermediate" will again permit escapement of the ratchet plate 60 and upon rotative return of the cam unit the energy stored in the spring 69 will further be effective to shift the cam unit to "high" position for the completion of the gear shift to "high".

It will of course be understood that the original or normal tension of the spring 69 will be substantially sufficient to overcome the ordinary frictional resistance and inertia of the cam unit against longitudinal shifting, and the frictional retarding influence of the ratchet plate 60, due to its spring 64, so that said spring 69 will not be compressed to store energy unless the cam unit is positively held against shifting by the forked plate 52 or the ratchet plate 60, or is appreciably retarded by fouling or clogging of the parts.

Thus the mechanism above described permits an unrestricted pre-selection while the gears are being shifted and a pre-selection in one direction of a speed change to be subsequently and automatically determined in a step-by-step progressive sequence, and while such mechanism in this preferred form of embodiment is fully capable of fulfilling all of the objects primarily stated, it is to be understood that I do not wish to limit the invention to any of the specific details herein disclosed, for it is susceptible of embodiment in various other forms, all embraced within the scope of the claims which follow.

I claim:

1. In a gear shift mechanism, the combination of: shifter members each separately translatable in opposite directions from a neutral position to effect different gear changes; a rotary actuator unit having a plurality of relatively spaced shifter engaging elements and axially translatable across the paths of said shifter members; means for axially translating said unit to selective positions corresponding to the desired gear shift, to position one of said elements in cooperative alignment with one of said shifter members; and means for subsequently rotating said actuator unit in a positive operative direction to translate the selected shifter member in a proper direction to effect the desired gear change.

2. In a gear shift mechanism, the combination of: a shifter member translatable in opposite directions from a neutral position to effect different gear changes; a rotary actuator unit having relatively spaced shifter engaging elements and axially translatable across the path of said shifter member; means for axially translating said unit to selective positions corresponding to the desired gear shift, to position one of said elements in cooperative alignment with said shifter member; and means for subsequently rotating said actuator unit in a positive operative direction to translate said shifter member in a proper direction to effect the desired gear change.

3. In a gear shift mechanism, the combination of: shifter members each separately translatable in opposite directions from a neutral position to effect different gear changes; a rotary actuator unit rotatable in a positive operative direction to translate one or the other of said shifter members in either direction; means for axially translating said actuator unit to pre-determine the shifter member to be actuated and the direction of such actuation; and means for subsequently rotating said actuator unit to effect the desired gear change.

4. In a gear shift mechanism, the combination of: a shifter member translatable in opposite directions from a neutral position to effect different gear changes; a rotary actuator unit rotatable in a positive operative direction to translate said shifter member in either direction; means for axially translating said actuator unit to pre-determine the direction of actuation of said shifter member; and means for subsequently rotating said actuator unit to effect the desired gear change.

5. In a gear shift mechanism, the combination of: a shifter member having opposed cam shoulders and translatable in opposite directions from a neutral position to effect different gear changes; a rotatory actuator cam unit having oppositely disposed cam lugs spaced longitudinally; means for axially translating said unit selectively across the path of said shifter member to align one of said lugs with one of said cam shoulders; and means for subsequently rotating said cam unit in a positive operating direction to translate the shifter member in a proper direction to effect the desired gear change.

6. In a gear shift mechanism, the combination of: a rotary actuator unit; a gear shifting cam plate translatable transversely thereto forwardly or rearwardly from a neutral position to effect different gear changes, said plate having opposed cam shoulders disposed respectively above and below said actuator unit, said actuator unit being provided with two actuator lugs relatively spaced longitudinally and circularly; means for axially translating said unit selectively across the path of said plate to align one of said lugs with one of said cam shoulders; and means for subsequently rotating said actuator unit in a positive operating direction to cause said aligned lug to translate said cam plate in the pre-selected direction to effect the desired gear change.

7. In a gear shift mechanism, the combination of: shifter members each separately translatable in opposite directions from a neutral position to effect different gear changes, said members each having opposed cam shoulders; a rotary actuator cam unit having two pairs of oppositely disposed cam lugs with the several lugs relatively spaced longitudinally of said unit; means for axially translating said unit selectively across the paths of said shifter members to align one of said lugs with one of said cam shoulders; and means for subsequently rotating said cam unit in a positive operating direction to cause said aligned lug to translate one of said shifter members in either direction, depending upon the pre-selective positioning of said cam unit, to effect the desired gear change.

8. In a gear shift mechanism, the combination of: shifter members having opposed abutments and each separately translatable in opposite directions from a neutral position to effect different gear changes; a rotary actuator unit having a plurality of longitudinally spaced pairs of shifter engaging elements with those of each pair circularly spaced, said unit being axially translatable across the paths of said shifter members; means for selectively translating said actuator unit to a position corresponding to the desired gear change with one of said elements in alignment with one of the abutments of a shifter member; and means for subsequently rotating said actuator unit in one direction to cause said aligned element to effect a translation of either of said shifter members in either direction, depending upon the pre-selective translation of said actuator unit.

9. In a gear shift mechanism, the combination of: a rotary shaft; an actuator unit rotatable with said shaft and axially slidable thereon; parallel shifter members each separately translatable transversely of said unit in opposite directions from a neutral position to effect different gear changes, each of said members having opposed abutments disposed respectively on opposite sides of said actuator unit, said actuator unit being provided with shifter engaging elements relatively spaced circularly and longitudinally of said unit and each adapted to singly engage an abutment on one of said shifter members; means for axially translating said actuator unit on said shaft to select the shifter member to be operated and the abutment thereof to be engaged; and means for rotating the shaft and actuator unit in one direction to effect the desired gear change and in a reverse direction to rotatively normalize said unit.

10. In a gear shift mechanism, the combination of: shifter members each separately translatable in opposite directions from a neutral position to effect different gear changes; a rotary actuator unit having a plurality of relatively longitudinally spaced shifter engaging elements and axially translatable across the paths of said shifter members, said unit also having an aligning member; a stationary forked plate providing slots in which the aligning member may engage to retain said actuator unit against translation during a gear shifting operation; means for axially translating said actuator unit to selective positions corresponding to the desired gear change, to position one of said elements in cooperative alignment with one of said shifter members; and means for subsequently rotating said unit in a positive operating direction to cause said aligned element to translate the selected shifter member in a proper direction to effect the desired gear change and to engage the aligning member in a slot of said forked plate.

11. In a gear shift mechanism, the combination of: shifter members each separately translatable in opposite directions from a neutral position to effect different gear changes; a rotary actuator unit having a plurality of relatively longitudinally spaced shifter engaging elements and axially translatable across the paths of said shifter members; means for axially translating said unit to selective positions corresponding to the desired gear shift, to position one of said elements in cooperative alignment with one of said shifter members; means for subsequently rotating said actuator unit in a positive operative direction to cause said aligned element to translate the selected shifter member in a proper direction to effect the desired gear change; and means for preventing translation of said actuator unit during a gear shifting operation.

12. In a gear shift mechanism, the combination of: gear shifting members; an actuator therefor operated by the clutch pedal and adapted to be selectively translated prior to each pedal actuation, to determine a gear change to be effected; escapement means for directing a progressive changing of the gears in advancing from reverse to high driving speeds upon successive actuations of the clutch pedal; and means for predetermining by a single selective operation the scope of such progressive gear changing, said means including a tension element adapted to store energy for progressively translating said actuator through the selected scope of pedal actuations necessary to effect the desired speed change.

13. In a gear shift mechanism, the combination of: gear shifting forks; an independent plate for actuating each fork; a rotary plate actuator translatable axially to selective positions relative to said plates and adapted to move either of said plates in a forward or a reverse direction during its rotation in one direction and to be reversely rotated to normal rotative position independently of said plates; means for translating said actuator to select the gear change to be effected; and means for rotating said actuator to effect the selected gear change.

14. In a gear shift mechanism, the combination of: shifter members each separately movable in opposite directions from a neutral position to effect different gear changes; a rotary actuator unit having a plurality of relatively spaced shifter engaging elements and opposed neutralizing cam surfaces, said unit being adapted to be axially translated across the paths of said shifter members; means for translating said unit to selective positions corresponding to the desired gear shift, to position one of said elements in cooperative alignment with one of said shifter members; and means for subsequently rotating said actuator unit in a positive operating direction to first engage said neutralizing cam surfaces with such shifter member as may have been moved from neutral in a previous gear change, to neutralize such shifter, and to then move the selected shifter member in a proper direction to effect the desired gear change.

15. A rotary actuator for a gear shift mechanism comprising: a body of general cylindrical shape, said body being longitudinally cut-away to permit axial selective translation and to provide opposed neutralizing faces and intermediate cylindrical retaining surfaces; longitudinally and circularly spaced operating lugs provided upon said retaining surfaces; and clearance grooves in said neutralizing faces.

16. A rotary actuator for a gear shift mechanism, comprised of: a body of general cylindrical shape having diametrically opposed cam surfaces and intermediate cylindrical surfaces; longitudinally and circularly spaced cam lugs extending radially from said cylindrical surfaces; an aligning member extending radially from said body; and clearance grooves in said body aligned with the respective lugs.

17. In a gear shift mechanism, the combination of: shifter members each separately movable in opposite directions from a neutral position to effect different gear changes; a rotary actuator unit selectively translatable across the paths of said shifter members and having shifter member normalizing means and a plurality of relatively longitudinally spaced shifter engaging elements; means for translating said unit to a selective position corresponding to the desired gear shift, to position one of said elements in cooperative alignment with one of said shifter members; and means for rotating said actuator unit in a positive operative direction to first insure a normalizing of said shifter members and to subsequently move the selected shifter member in a proper direction to effect the desired gear shift.

18. In a gear shift mechanism, the combination of: gear shifting means; an actuating rotor therefor, rotatable between a normal position and an actuating position; means for applying power sufficient for shifting said rotor axially between non-consecutive gear shifting stations when said rotor is in normal position; and automatic means for halting said rotor at each intermediate station while said rotor is rotated from normal position to actuating position and back to normal position.

19. In a gear shift mechanism, the combination of: gear shifting means; an actuating rotor therefor, rotatable between a normal position and an actuating position; means for applying power sufficient for shifting said rotor axially between non-consecutive gear shifting stations when said rotor is in normal position; and automatic means for halting said rotor at each intermediate station while said rotor is rotated from normal position to actuating position and back to normal position, said last named means then permitting said rotor to be shifted to the next consecutive station.

20. In a gear shift mechanism, the combination of: an actuating rotor, rotatable between a normal position and an actuating position; means for applying power sufficient for shifting said rotor axially between non-consecutive gear shifting stations when said rotor is in normal position; a stop formed upon said rotor; a ratchet member engageable by said stop, when said rotor is in normal position, and mounted for a limited shifting with said rotor for the distance between consecutive stations when so engaged by said stop; and yieldable means urging said ratchet member in a return direction, said stop disengaging said ratchet means when said rotor is rotated to actuating position and permitting said yieldable means to return said ratchet means to its original position.

21. In a gear shift mechanism, the combination of: an actuating rotor, rotatable between a normal position and an actuating position; means for applying power sufficient for shifting said rotor axially between non-consecutive gear shifting stations when said rotor is in normal position; a stop formed upon said rotor; a ratchet member engageable by said stop, when said rotor is in normal position, and mounted for a limited shifting with said rotor for the distance between consecutive stations when so engaged by said stop; yieldable means urging said ratchet member in a return direction, said stop disengaging said ratchet means when said rotor is rotated to actuating position and permitting said yieldable means to return said ratchet means to its original position; and a guide engaged by said stop while said rotor is rotated between its normal and actuating positions to prevent axial movement of said rotor until it is returned to normal position.

22. In a gear shift mechanism, the combination of: an actuating rotor, rotatable between a normal position and an actuating position; means for applying power sufficient for shifting said rotor axially between non-consecutive gear shifting stations when said rotor is in normal position; a stop formed upon said rotor; a toothed ratchet member engageable by said stop upon one of said ratchet teeth, when said rotor is in normal position, and mounted for a limited shifting with said rotor for the distance between consecutive stations when so engaged by said stop; and yieldable means urging said ratchet member in a return direction, said stop disengaging said ratchet means when said rotor is rotated to actuating position and permiting said yieldable means to return said ratchet to its original position, said stop engaging an advanced tooth of said ratchet means when said rotor is returned to normal position.

23. In a gear shift mechanism, the combination of: an actuating rotor, rotatable between a normal position and an actuating position; means for applying power sufficient for shifting said rotor axially between non-consecutive gear shifting stations when said rotor is in normal position; a stop formed upon said rotor; a toothed ratchet member engageable by said stop upon one of said ratchet teeth, when said rotor is in normal position, and mounted for a limited shifting with said rotor for the distance between consecutive stations when so engaged by said stop; yieldable means urging said ratchet member in a return direction, said stop disengaging said ratchet means when said rotor is rotated to actuating position and permitting said yieldable means to return said ratchet means to its original position, said stop engaging an advanced tooth of said ratchet means when said rotor is returned to normal position; and a guide engaged by said stop while said rotor is rotated between its normal and actuating positions to prevent axial movement of said rotor until it is returned to normal position.

24. In a gear shift mechanism, the combination of: an actuating rotor, rotatable between a normal position and an actuating position; means for applying power sufficient for shifting said rotor axially between non-consecutive gear shifting stations when said rotor is in normal position; a stop formed upon said rotor; a toothed ratchet member engageable by said stop upon one of said ratchet teeth, when said rotor is in normal position, and mounted for a limited shifting with said rotor for the distance between consecutive stations when so engaged by said stop; and yieldable means urging said ratchet member in a return direction, said stop disengaging said ratchet means when said rotor is rotated to actuating position and permitting said yieldable means to return said ratchet means to its original position, said stop engaging an advanced tooth of said ratchet means when said rotor is returned to normal position, said ratchet means being yieldably shiftable away from said rotor so that when said rotor is returned to the station from which it started, said ratchet means will idle over said stop.

25. In a gear shift mechanism, the combination of: a shifter cam plate translatable in opposite directions from a neutral position to effect different gear changes, an opening being formed in said plate; a cylindrical rotary actuator cam unit longitudinally grooved to form a pair of diametrically opposed normalizing cams, each of which cams has an actuating lug, said lugs being spaced apart axially, there being a clearance slot provided in each of said normalizing cams opposite the actuating lug on the other cam; means for moving said unit in an axial direction through the opening in said plate until one of said lugs is aligned with said plate, there being normalizing surfaces formed by said opening in said plate on opposite sides of said actuator unit and lying in planes substantially tangent to the cylindrical surface of said actuator unit when said plate is in neutral position, and there being an actuating surface formed by said opening adjacent to each of said normalizing surfaces and substantially parallel thereto; and means for rotating said cam unit, when so axially positioned, so that the normalizing cam aligned with said plate will contact a normalizing surface thereof, if said cam plate is disposed in a given gear shifting position, and will move said cam plate to neutral position, and so that said aligned lug will then engage the actuating surface adjacent to said contacted normalizing surface and move said cam plate into another gear shifting position.

26. A gear shift mechanism constructed and operating as described in claim 25, in which the normalizing surface opposite that which is contacted moves into the clearance slot opposite said active lug when said lug moves said cam plate into gear shifting position.

27. In a gear shift mechanism, the combination of: shifting members each separately movable in opposite directions from a neutral position to effect different gear changes; a shaft; a rotary actuator unit having a plurality of relatively spaced shifter engaging elements and axially translatable upon said shaft across the paths of said shifter members; means for axially translating said unit to selective positions corresponding to the desired gear shift, to position one of said elements in corresponding alignment with one of said shifter members; and lost motion means associated with the clutch pedal and comprising an arm secured on the shaft, said arm having a non-radial slot formed therein, a link pivoted at one end to the clutch pedal, the other end having guiding means whereby said link moves through a definite path relative to said shaft when said clutch pedal is actuated, a runner provided on said link and sliding in said slot to retain said arm in a given normal radial position during the unclutching portion of the forward movement of said clutch pedal, said runner then engaging the end of said slot and positively rotating said arm during further movement of said clutch pedal, the return movement of said clutch pedal causing positive return rotation of said arm and its positive retention in said normal position in reverse order from that caused by the forward motion of said clutch pedal.

28. A rotary actuator for a gear shift mechanism comprising: a body of general cylindrical shape having diametrically opposite cylindrical surfaces, said body being longitudinally cut-away between said surfaces to provide opposite substantially spiral cam surfaces; longitudinally and circularly spaced cam lugs provided upon said cylindrical surfaces; and clearance grooves cut in said body opposite said lugs.

29. A lost motion mechanism whereby a definite mechanical relation is set up between a primary member, movable in a definite path, and a shaft, said mechanism comprising: an arm secured on said shaft, said arm having a non-radial slot formed therein; a link pivoted at one end to said primary member, the other end having a guiding means whereby said link moves through a definite path relative to said shaft when said primary member is moved; and a runner provided on said link and sliding in said slot to retain said arm in a given normal radial position during the first portion of a given movement of said primary member, said runner then engaging an end of said slot and positively rotating said arm during further movement of said primary member, the return movement of said primary member positively causing return rotation of said arm, and its positive retention in said normal position, in reverse order from that caused by the original movement of said primary member.

30. A mechanism as described in claim 29, in which said guiding means comprises a second slot formed in said link and slidably embracing said shaft.

31. A mechanism as described in claim 29, in which said guiding means comprises a second slot formed in said link and slidably embracing said shaft, said runner, when engaging said end of said first slot to turn said arm, being at a radius from the axis of the shaft which is greater than the distance of said runner from the axis of said second slot, said second slot therefore having an arcuate surface to permit said runner to revolve a given distance about the axis of said shaft at said radius.

In testimony whereof, I have hereunto set my hand at Los Angeles, California, this 11th day of March, 1926.

BENJAMIN F. SCHMIDT.